United States Patent
Frazier et al.

(10) Patent No.: US 9,628,323 B1
(45) Date of Patent: Apr. 18, 2017

(54) SELECTIVE ROUTING OF ASYNCHRONOUS EVENT NOTIFICATIONS

(71) Applicant: International Business Machines Corporation, Armonk, NY (US)

(72) Inventors: Giles R. Frazier, Austin, TX (US); Michael Karl Gschwind, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/943,242

(22) Filed: Nov. 17, 2015

(51) Int. Cl.
| | |
|---|---|
| G06F 15/173 | (2006.01) |
| G06F 9/46 | (2006.01) |
| H04L 12/24 | (2006.01) |
| H04L 29/08 | (2006.01) |
| H04L 12/911 | (2013.01) |
| G06F 9/50 | (2006.01) |

(52) U.S. Cl.
CPC .............. *H04L 41/06* (2013.01); *G06F 9/50* (2013.01); *H04L 47/70* (2013.01); *H04L 67/142* (2013.01)

(58) Field of Classification Search
CPC . G04L 47/50; G04L 47/70; G06F 9/50; H04L 67/41; H04L 47/70
See application file for complete search history.

(56) References Cited

U.S. PATENT DOCUMENTS

| | | | |
|---|---|---|---|
| 8,230,433 B2 | 7/2012 | Chiu et al. | |
| 8,892,802 B2 | 11/2014 | Amit et al. | |
| 8,924,971 B2 | 12/2014 | Ahrens et al. | |
| 2012/0089979 A1* | 4/2012 | Adar | G06F 9/45558 718/1 |
| 2015/0142501 A1* | 5/2015 | Nair | G06Q 10/06316 705/7.26 |

OTHER PUBLICATIONS

Power ISA V 2.07, "Event-Based Branch Facility", Book II, Chapter 7, pp. 817-820. (May 13, 2013), https://www.power.org/wp-content/uploads/2013/05/PowerISA_V2.07_PUBLIC.pdf.

* cited by examiner

*Primary Examiner* — Camquy Truong
(74) *Attorney, Agent, or Firm* — Patterson + Sheridan, LLP (57) ABSTRACT

A processor enables simultaneous use of a single facility by an application, and privileged operators, such as an operating system or a hypervisor. The processor includes a routing register, which may be initialized by an operating system (or hypervisor), to indicate which subsets of a facility are used by which entity. The processor is configured to determine the entity assigned to a given subset of the facility in response to an event notification, and selectively route the event notification to the appropriate entity.

17 Claims, 6 Drawing Sheets

SELECTIVE ROUTING OF ASYNCHRONOUS EVENT NOTIFICATIONS

BACKGROUND

1. Field of Invention

The present disclosure relates to processing systems and processors, and more specifically, and more specifically to techniques for sharing a single set of controls to enable an application to control multiple facilities.

2. Description of Related Art

In present-day processors, large numbers of facilities are available in each processing unit and multiple privilege levels and/or levels of virtualization are typically present during execution of programs in present-day systems. The hardware facilities within the processors are typically managed at the highest privilege level, which in multi-level virtualized system, is generally controlled by a hypervisor that manages availability and allocation of the hardware resources, such as processing units, to one or more operating systems images. In multi-level managed systems, supervisors, which are operating systems processes that schedule and manage the execution of applications, are executed at a privilege level between that of the hypervisor and the applications.

SUMMARY

According to one embodiment, a method, a system, and a computer readable storage medium for a single set of controls to enable event notifications from multiple facilities and subsets thereof to be routed to either an application, an operating system, or a hypervisor is disclosed herein. The processor includes a routing register, which may be initialized by an operating system (or hypervisor), to indicate which subsets of a facility are used by which entity. The processor is configured to determine the entity assigned to a given subset of the facility in response to an event notification, and selectively route the event notification to the appropriate entity.

BRIEF DESCRIPTION OF THE SEVERAL VIEWS OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

For clarity, identical reference numerals have been used, where applicable, to designate identical elements that are common between figures. Additionally, elements of one embodiment may be adapted for use with other embodiments.

DETAILED DESCRIPTION

Figure 1:
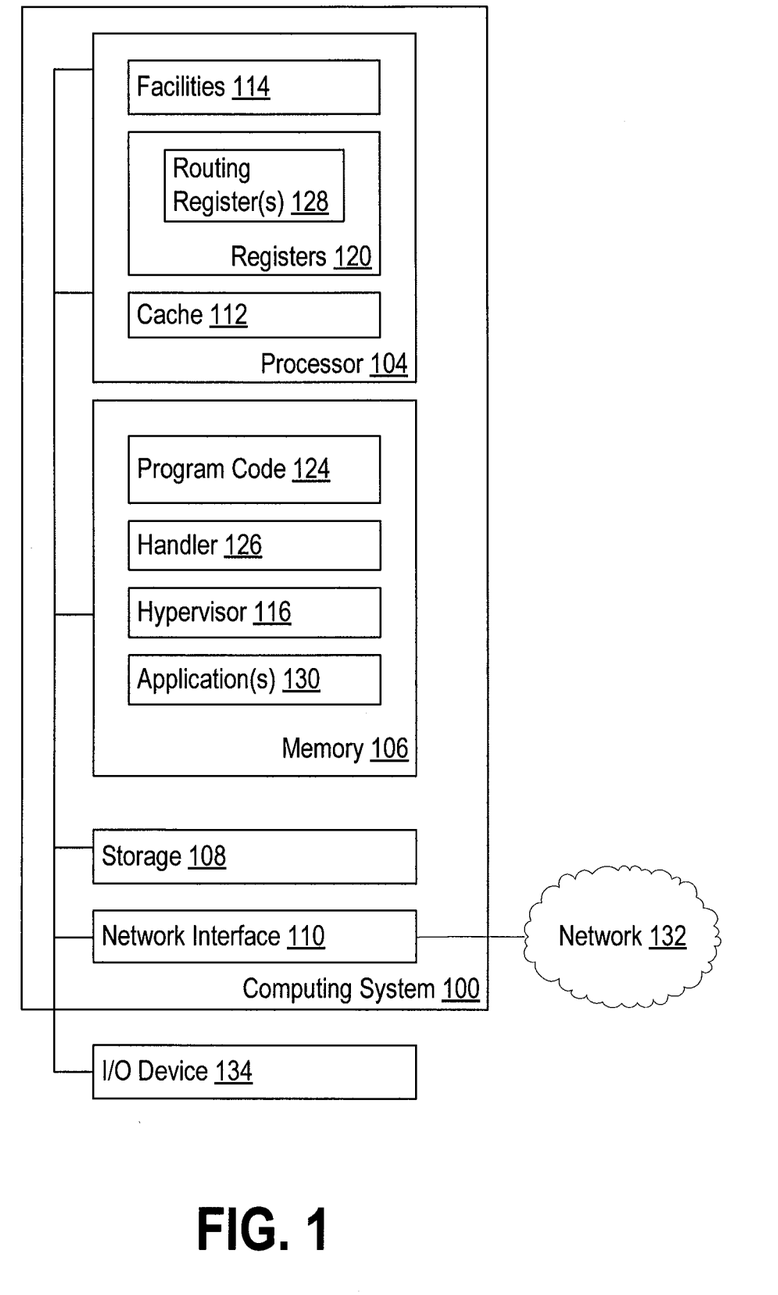
FIG. 1 is a block diagram of a computing system, according to one embodiment disclosed herein.

FIG. 1 is a block diagram of a computing system 100, according to one embodiment. The computing system 100 includes a processor 104, memory 106, storage 108, and a network interface 110. The processor 104 retrieves and executes programming instructions stored in memory 106 as well as stores and retrieves application data residing in the cache 112. The processor 104 is included to be representative of a single processor, multiple processors, a single processor having multiple processing cores, and the like. The storage 108 may be a disk drive storage device. Although shown as a single unit, the storage 108 may be a combination of fixed and/or removable storage devices, such as fixed disk drives, removable memory cards, optical storage, network attached storage (NAS), or storage-area-network (SAN). The network interface 110 may be any type of network communications allowing the computing system 100 to communicate with other computers via a network 132. The computing system 100 also includes an I/O device 134 (e.g. keyboard and mouse devices) connected to the computing system 100.

The processor 104 includes facilities 114, registers 120, and cache 112. The facilities 114 are hardware sub-units or sub-systems that are configured to perform one or more specialized processor-related tasks. Each hardware facility 114 can be comprised of special-purpose hardware registers, counters, events, controls, and instructions for performing the designated task of the hardware facility. The processor 104 may include one or more hardware facilities that facilitate or monitor operations of the processor 104 (e.g., performance monitor), as well as one or more hardware facilities 114 that perform or monitor facilities that are independent of the processor 104. One example of a facility that monitors operations of a processor is a processor performance monitor facility, configured to track various performance characteristics such as instructions executed, cache misses, processor stalls, and other performance related events. An example of a facility that monitors events independent of the processor is an event reception facility that monitors or controls events unrelated to processor execution, such as incoming signals from other processors or devices.

As the complexity of facilities such as performance monitors increases, there is a need to make the most efficient use of such facilities. For example, a performance monitor configured to be shared by an application and an operating system, rather than dedicated exclusively to either to the application or the operating system, would enable a higher degree of utilization of the performance monitor. Accordingly, embodiments of the present disclosure allow for such simultaneous sharing by enabling the ability to route event notifications associated with a facility to the appropriate routine for handling.

In some embodiments, the registers 120 contain various types of fields or bits for providing information about the operation of the facilities 114 and for managing the operation of the facilities 114 including restarting the facilities 114. The registers 120 include a routing register 128. In one embodiment, the routing register 128 may be a routing register for the operating system. In another embodiment, the routing register 128 may be a routing register for the hypervisor. In yet another embodiment, the registers 120 include two routing registers 128, one for the operating system, and one for the hypervisor. Other registers may be located within the set of registers and the registers shown may be located elsewhere in the processor 104. Alternative embodiments may utilize different types of registers to implement the functionality described herein. The routing register 128 contains multiple fields, where each field corresponds to a given facility. The routing register 128 is shown in more detail in FIG. 2.

Figure 2:
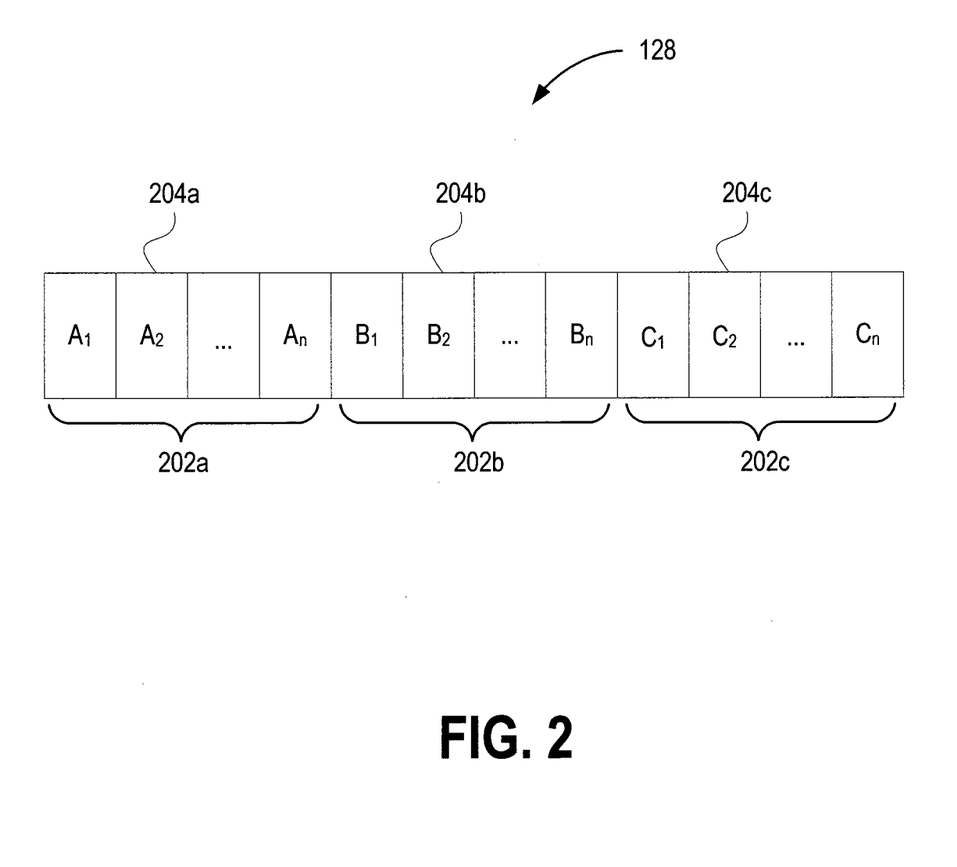
FIG. 2 is a block diagram of a routing register from FIG. 1, according to one embodiment disclosed herein.

FIG. 2 is a block diagram of the routing register 128 from FIG. 1, according to one embodiment. The routing register 128 includes a plurality of fields 202a, 202b, 202c corresponding to a plurality of facilities A, B, and C. Each field 202a, 202b, 202c includes a plurality of subfields. A subfield corresponds to a subset of a facility, which refers to an appropriate entity. The subfields are used to route the asynchronous event notifications related to the subsets of a facility to the application, the operating system, or the hypervisor. Field 202a includes subfields 204a. Field 202b includes subfields 204b. Field 202c includes subfields 204c. The subfields 204a, 204b, 204c are used to route asynchronous event notifications related to the subsets of a facility to an appropriate entity. That is, the values in the subfields can be used to indicate whether an event occurring for the corresponding subset of a facility should be routed directly to an application, or to the operating system, or, in some embodiments, to a hypervisor.

Referring back to FIG. 1, the memory 106 includes program code 124 instructions for application 130, a hypervisor 116, and a handler 126. Some of these program code instructions may include instructions for enabling simultaneous use of a single facility. The hypervisor 116 is configured to manage data shared between different virtual machines (not shown). The handler 126 is configured to process exceptions and interrupts to the facilities 114.

Figure 3:
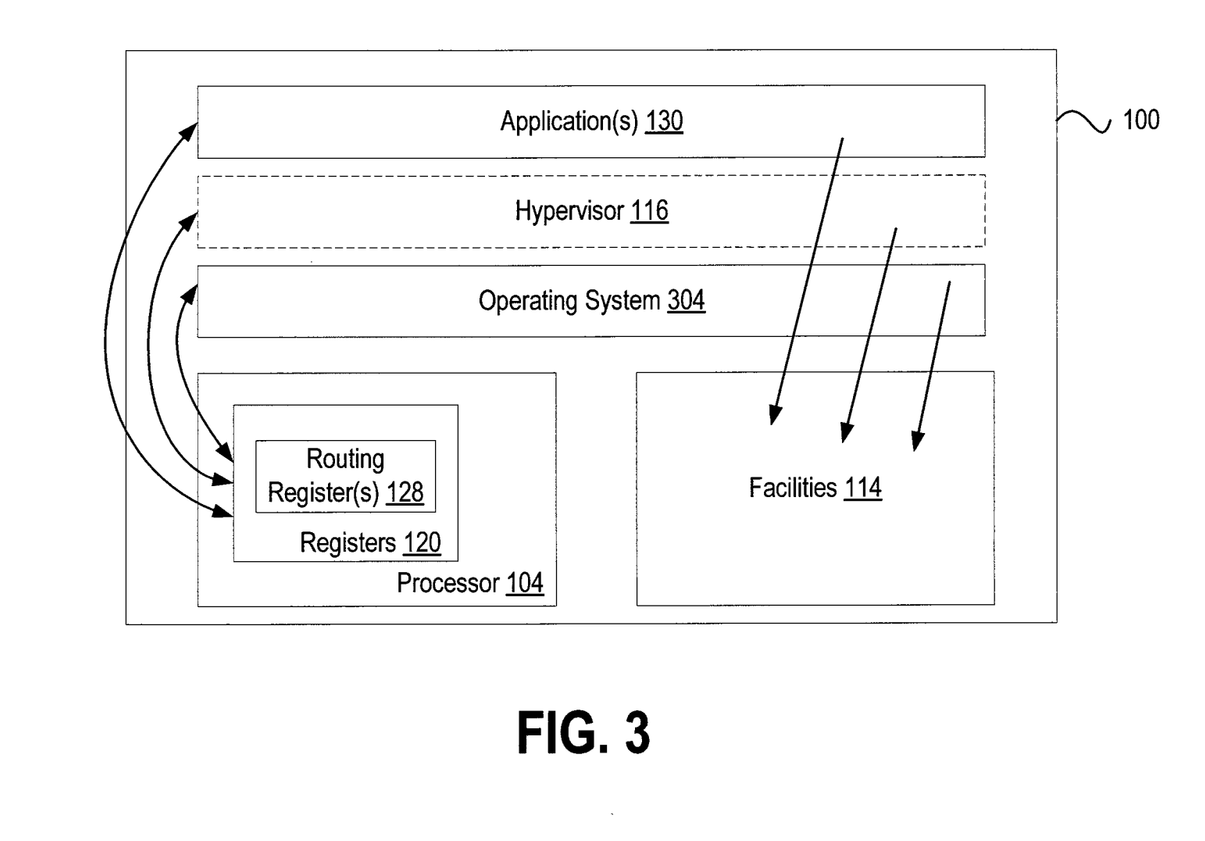
FIG. 3 is a block diagram of elements of the computing system interacting, according to one embodiment.
Figure 4:
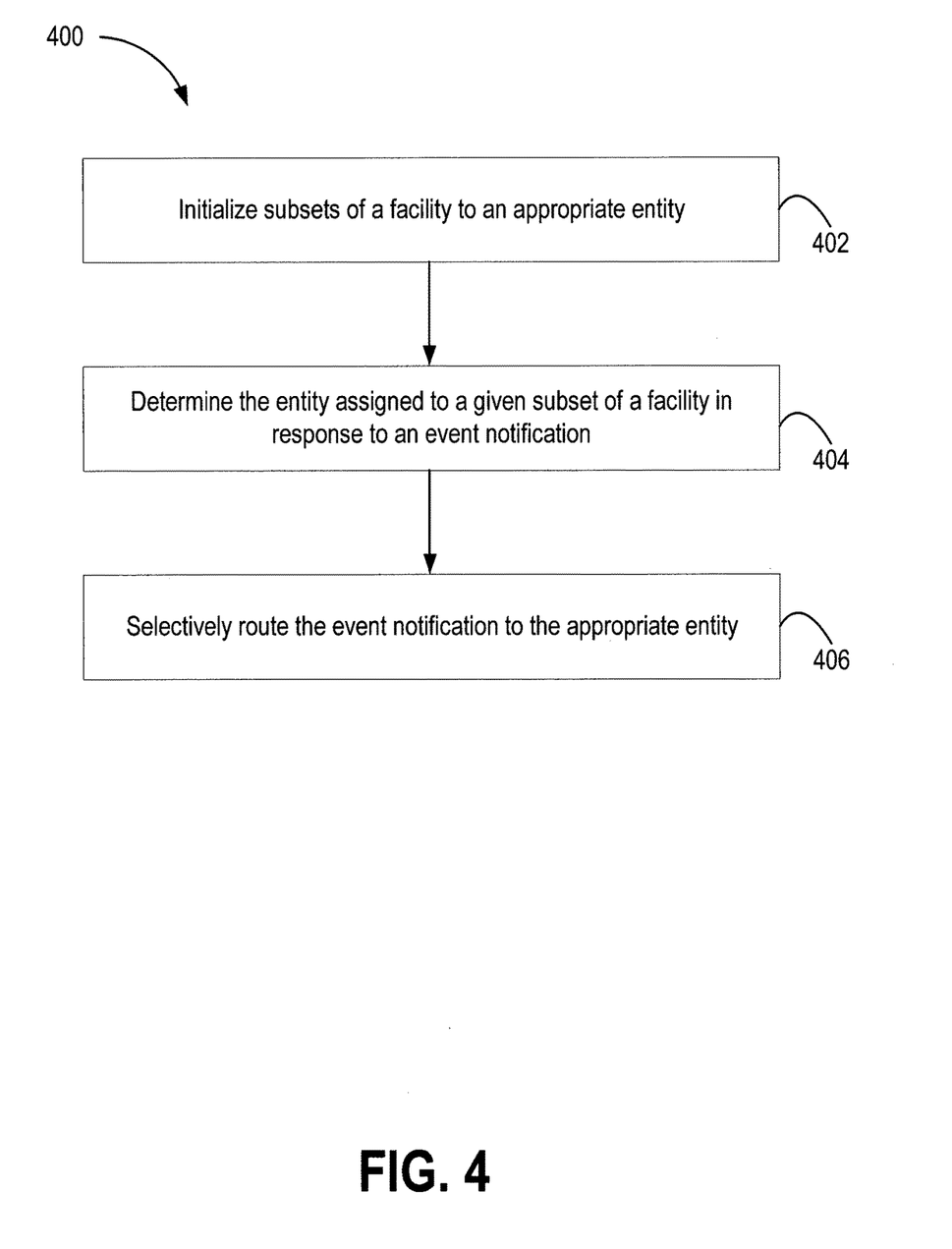
FIG. 4 illustrates a method of performing an operation for enabling simultaneous use of a single facility, according to one embodiment disclosed herein.

FIG. 3 is a block diagram of elements of the computing system 100 interacting, according to one embodiment. FIG. 4 illustrates a method 400 of performing an operation for enabling simultaneous use of a single facility. The method begins at step 402. At step 402, an operating system initializes subsets of a facility to an appropriate entity. The subsets are used to route asynchronous event notifications to the appropriate entity. In one embodiment, the appropriate entity may be either an application or the operating system. The operating system may initialize a subset of a facility to route its asynchronous events to the application or the operating system. In another embodiment, at step 402 a hypervisor initializes subsets of the facility to the appropriate entity. For example, the appropriate entity may be an application, the operating system, or the hypervisor. Initially, the hypervisor 116 sets each subset field such that synchronous event notifications are routed to the appropriate entity. The subfields in routing register 128 for events that the hypervisor routes to itself become unavailable to the operating system. Subsequently, the operating system 304 initializes the remaining sub-fields to route events associated with the sub-fields to either itself or the application. In embodiments where the hypervisor 116 is executing in the computing system 100, the application 130 can be a guest application executing in a virtual machine managed by the hypervisor 116 or other user-level application supported by the operating system 304. The hypervisor 116 modifies a first subfield corresponding to a first subset of the facility to indicate that the first subset of the facility is assigned to the application 130, the operating system 304, or hypervisor 116. The hypervisor 116 also modifies a second subfield corresponding to a second subset of the facility to indicate that the second subset of the facility is assigned to an application. The operating system 304 may subsequently modify any subset of a facility that has been assigned to it so as to indicate that the subset of the facility is assigned to an application 130; also, the operating system 304 may subsequently modify any subset of a facility that has been assigned to an application 130 so as to indicate that the subset of the facility is assigned to the operating system 304, itself.

At step 404, when an event occurs the processor 104 determines the entity assigned to a given subset of the facility in response to an event notification based on the contents of the routing register 128.

At step 406, the processor selectively routes the event notification to the appropriate entity. If the hypervisor 116 or the operating system 304 is to be notified, either a hypervisor-level or an operating-system-level interrupt will occur. If the application is to be notified, an event-based branch will occur. Referring to FIG. 3, the hypervisor 116 communicates with the facilities 114 in order to respond to a hypervisor-level interrupt, the operating system 304 communicates with the facilities 114 in order to respond to an operating system-level interrupt, or the application 130 communicates with the facilities 114 in order to respond to an event-based branch.

Figure 5:
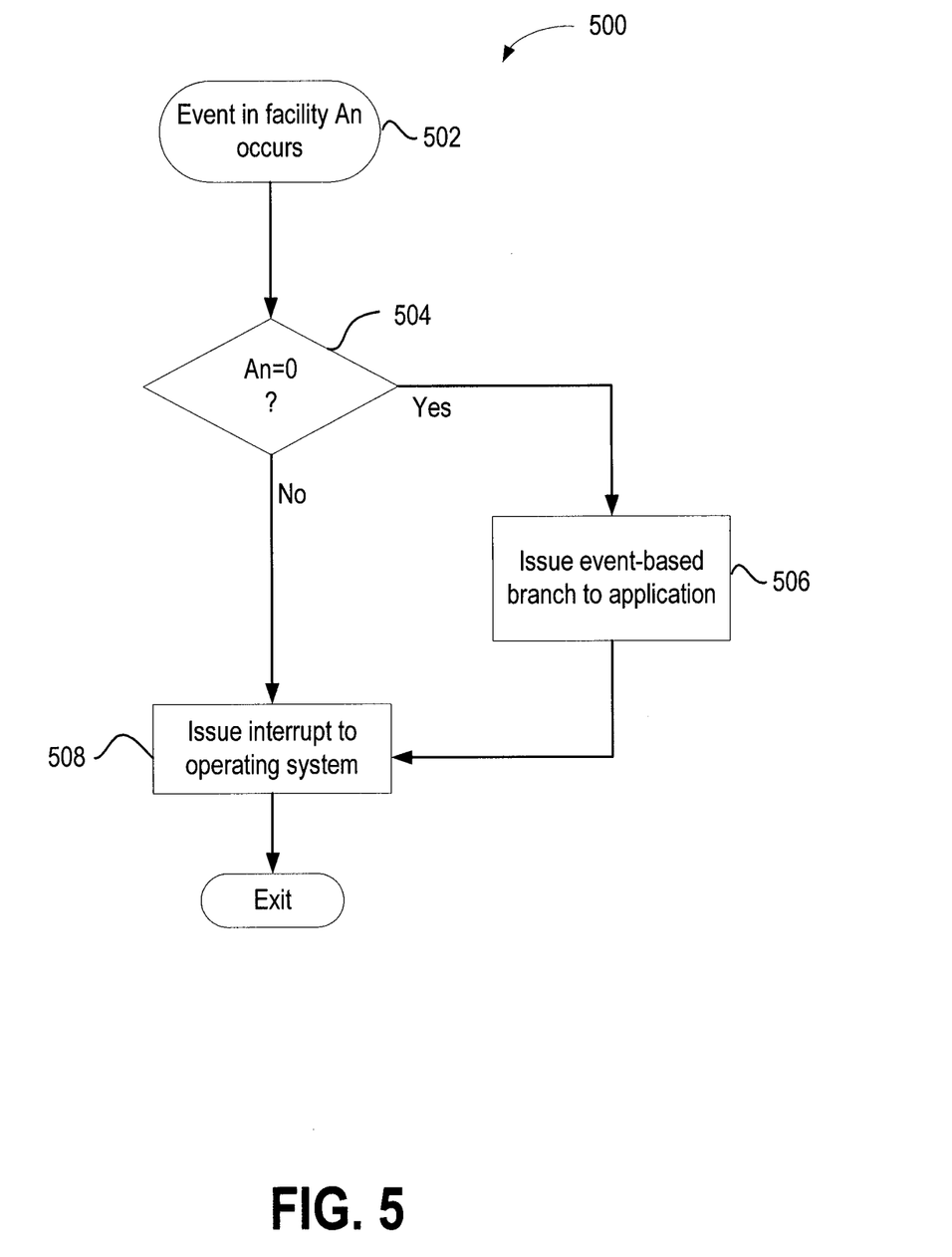
FIG. 5 is a flow diagram illustrating a method for enabling simultaneous use of a single facility, according to one embodiment disclosed herein.

FIG. 5 is a flow diagram illustrating a method 500 for simultaneous use of a single facility.

The method 500 begins at step 502. At step 502 an event in subset An of Facility A occurs. At decision block 504, the processor checks the value of the An subset in the routing register. For example, a value of 0 in the An subset would correspond to an application assigned to the subset, and a value of 1 in the An subset would correspond to the operating system assigned to the subset. If the subset An is assigned to the application, i.e. An=0, then at step 506, the processor issues an event based branch to the application. The application reads the status registers associated with the facility subset An, processes the event by writing to control registers that control facility An, and re-enables the facility An so additional events can occur.

If the subset An is assigned to the operating system, i.e. An=1, then at step 508, the processor issues an interrupt to the operating system to notify the operating system that an event has occurred. The operating system reads the status registers associated with the facility subset An, processes the event by writing to control registers that control facility An, and re-enables facility An so additional events can occur.

Note that both the application and the operating system use different subsets of the same facility simultaneously and can handle asynchronous events associated with the subset that they control. The simultaneous usage by the application and the operating system enables a much more efficient use of the facility because it enables the application and the operating system to simultaneously share a single facility such as the performance monitor.

Figure 6:
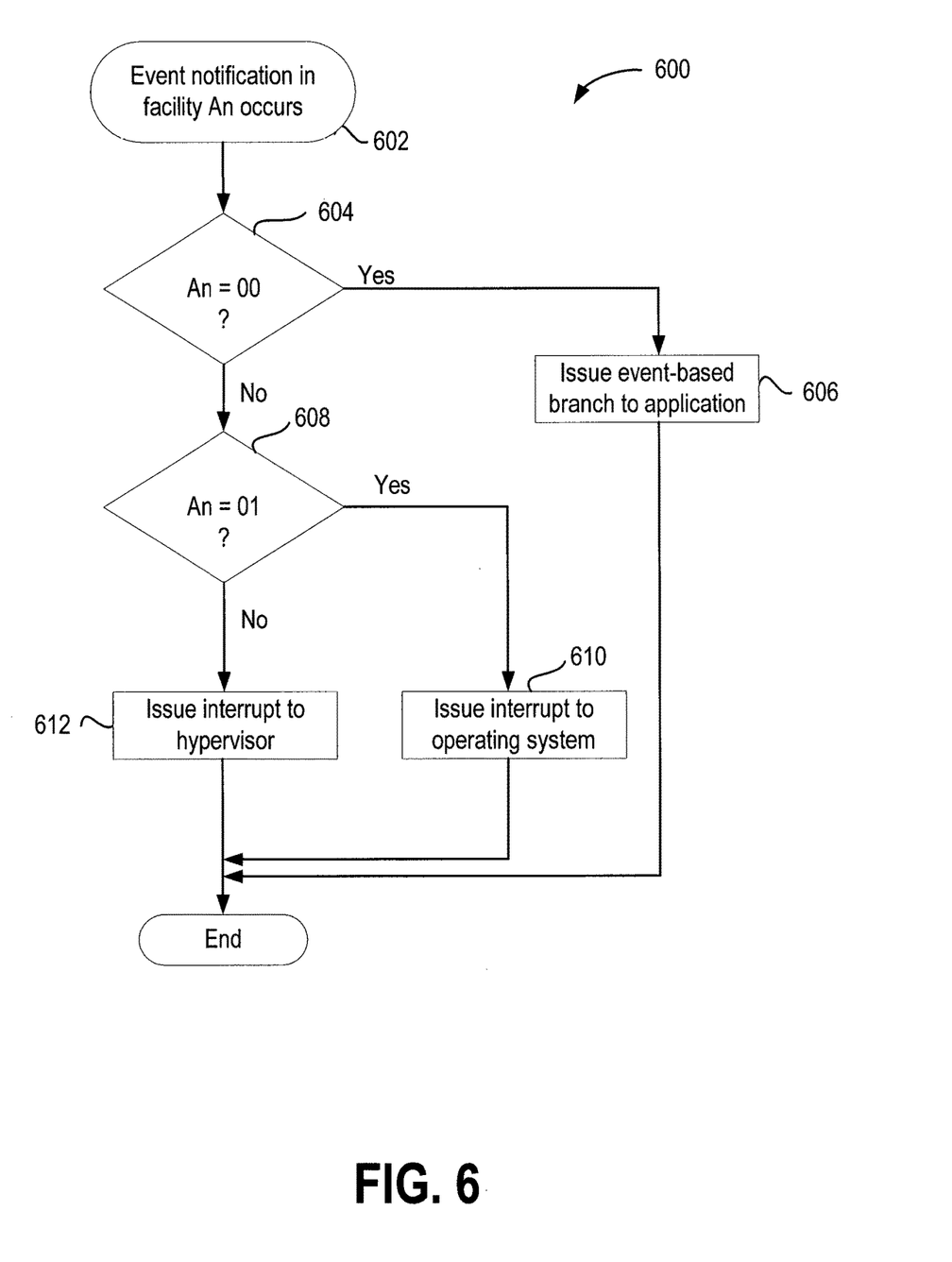
FIG. 6 is a flow diagram illustrating a method for enabling simultaneous use of a single facility, according to one embodiment disclosed herein.

FIG. 6 is a flow diagram illustrating a method 600 for simultaneous use of a single facility using a hypervisor.

The method 600 begins at step 602. At step 602 an event in subset An of Facility A occurs. At decision block 604, the processor checks the value of the An subset in the routing register. Because there are three options to which the processor can route the event notification, the value in each An subset is a two bit value. For example, a value of 00 in the An subset would correspond to an application. A value of 01 in the An subset would correspond to the operating system. A value of 10 would correspond to the hypervisor. If the subset An is assigned to the application, then at step 606, the processor issues an event based branch to the application. The application reads the status registers associated with the facility subset An, processes the event by writing to control registers that control facility An, and re-enables the facility An so additional events can occur.

At decision block 608, the processor determines if the An subset is assigned to the operating system. If the subset An is assigned to the operating system, then at step 610, the processor issues an interrupt to the operating system to notify the operating system that an event has occurred. The operating system reads the status registers associated with the facility subset An, processes the event by writing to control registers that control facility An, and re-enable facility An so additional events can occur.

If, at decision block 608, the processor determines that the An subset is assigned to the hypervisor, then at step 612 the processor issues an interrupt to the hypervisor to notify the hypervisor that an event has occurred. The hypervisor reads the status registers associated with the facility subset An, processes the event by writing to control registers that control facility An, and re-enables the facility An so additional events can occur. The hypervisor may retain control of a subset of any facility for its exclusive use. Asynchronous event notifications related to the subset are thus controlled by the hypervisor and are routed to the hypervisor. This may be appropriate for system-level notifications such as those that relate to processor functions that affect multiple operating systems.

The primary advantage of method 600 is that by providing selective routing of asynchronous event notifications to the appropriate entity (i.e. the application, the operating system, or the hypervisor), it enables simultaneous sharing of a facility by those three routines. A fine grained level of sharing is provided in a cost-effective and extendible manner by providing a single register (or registers) that can be designed to meet the specific needs of any environment. Example use cases include sharing performance monitors, sharing of special-purpose hardware such as Java garbage collectors, routing external events to the appropriate entity, and sharing of other facilities. The ability to route asynchronous event notifications to the appropriate entity enables higher facility utilization and lower hardware cost than is possible using today's hardware which cannot provide such routing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
   initializing, by an operating system, a first register having a plurality of subfields corresponding to a hardware facility, wherein each of the subfields corresponds to a subset of the hardware facility, wherein the first register assigns subsets of the hardware facility to an appropriate entity, and wherein the initializing the first register comprises:
      modifying a first subfield corresponding to a first subset of the hardware facility to indicate the first subset of the hardware facility is assigned to the operating system; and
      modifying a second subfield corresponding to a second subset of the hardware facility to indicate the second subset of the hardware facility is assigned to an application;
   responsive to detecting a hardware event associated with a given subset of the hardware facility, determining the entity assigned to a given subset of the hardware facility based on the first register; and
   selectively routing the event notification to the determined entity assigned to the given subset of the hardware facility.

2. The method of claim 1, wherein the entity is selected from the group consisting of an application and an operating system.

3. The method of claim 1, wherein the operating system initializes subsets of a plurality of facilities.

4. The method of claim 1, wherein the first register comprise a plurality of fields corresponding to a plurality of facilities, each field having a plurality of subfields.

5. The method of claim 1, wherein selectively routing the event notification to the determined entity assigned to the given subset of the hardware facility further comprises:
   generating an operating system interrupt to the operating system responsive to determining that the entity assigned to the subset of the hardware facility associated with the hardware event is the operating system.

6. The method of claim 1, wherein selectively routing the event notification to the determined entity assigned to the given subset of the hardware facility further comprises:
   triggering an event-based branch responsive to determining that the entity assigned to the subset of the hardware facility associated with the hardware event corresponding to an application.

7. A system, comprising:
   a plurality of hardware facilities including a first facility, each hardware facility comprised of a plurality of subsets of functionality;
   a memory containing an operating system configured to perform an operation to initialize the first register having a plurality of subfields corresponding to the first facility, wherein each of the subfields corresponds to a subset of the first facility, wherein the first register assigns subsets of the first facility to an appropriate entity, wherein the operation further comprises:

modifying a first subfield corresponding to a first subset of the first facility to indicate the first subset of the first facility is assigned to the operating system; and modifying a second subfield corresponding to a second subset of the first facility to indicate the second subset of the first facility is assigned to an application; and a processor, comprising:
  a first register comprised of a plurality of fields corresponding to the plurality of hardware facilities,
wherein the processor is configured to:
  responsive to detecting a hardware event associated with a given subset of the first facility, determine the entity assigned to a given subset of the first facility based on the first register; and
  selectively routing the event notification to the determined entity assigned to the given subset of the first facility.

8. The system of claim 7, the entity is selected from the group consisting of an application and the operating system.

9. The system of claim 7, wherein the operating system initializes subsets of a plurality of facilities.

10. The system of claim 7, wherein the first register comprises a plurality of fields corresponding to a plurality of facilities, each field having a plurality of subfields.

11. The system of claim 7, wherein selectively routing the event notification to the determined entity assigned to the given subset of the hardware facility further comprises:
  generating an operating system interrupt to the operating system responsive to determining that the entity assigned to the subset of the hardware facility associated with the hardware event is the operating system.

12. The system of claim 7, wherein selectively routing the event notification to the determined entity assigned to the given subset of the hardware facility further comprises:
  triggering an event-based branch responsive to determining that the entity assigned to the subset of the hardware facility associated with the hardware event is an application.

13. A method, comprising:
initializing, by a hypervisor, a first register having a plurality of subfields corresponding to a hardware facility, wherein each of the subfields corresponds to a subset of the hardware facility, wherein the first register assigns subsets of the hardware facility to an appropriate entity, and wherein initializing the first register further comprises:
  modifying a first subfield corresponding to a first subset of the hardware facility to indicate the first subset of the hardware facility is assigned to the hypervisor; and
  modifying a second subfield corresponding to a second subset of the hardware facility to indicate the second subset of the hardware facility is assigned to an application;
responsive to detecting a hardware event associated with a given subset of the hardware facility, determining the entity assigned to a given subset of the hardware facility based on the first register; and
selectively routing the event notification to the determined entity assigned to the given subset of the hardware facility.

14. The method of claim 13, wherein the entity is selected from the group consisting of an application, an operating system, and the hypervisor.

15. The method of claim 13, wherein selectively routing the event notification to the determined entity assigned to the given subset of the hardware facility further comprises:
  generating a hypervisor interrupt to the hypervisor responsive to determining that the entity assigned to the subset of the hardware facility associated with the hardware event is the hypervisor.

16. The method of claim 13, wherein the hypervisor initializes subsets of a plurality of facilities.

17. The method of claim 13, wherein the first register comprises a plurality of fields corresponding to a plurality of facilities, each field having a plurality of subfields.

* * * * *